United States Patent [19]

Barefoot

[11] 4,274,897

[45] Jun. 23, 1981

[54] METHOD AND APPARATUS FOR VULCANIZING TIRES

[76] Inventor: Carlton K. Barefoot, 601 Shellbark, Muncie, Ind. 47304

[21] Appl. No.: 57,417

[22] Filed: Jul. 13, 1979

[51] Int. Cl.³ .......................................... B29H 17/36
[52] U.S. Cl. ................................. 156/96; 156/394 FM; 425/17; 425/18
[58] Field of Search ............ 156/96, 123 R, 126–130, 156/394 R, 394 FM; 425/17, 18, 22, 24

[56] References Cited

U.S. PATENT DOCUMENTS

| | | | |
|---|---|---|---|
| 2,966,936 | 1/1961 | Schelkmann | 156/96 |
| 3,042,966 | 7/1962 | Laycox | 425/23 |
| 3,207,647 | 9/1965 | Schelkmann | 156/96 |
| 3,236,709 | 2/1966 | Carver | 156/96 |
| 3,325,326 | 6/1967 | Schelkmann | 156/96 |
| 3,689,337 | 9/1972 | Schelkmann | 156/95 |
| 3,729,358 | 4/1973 | Barefoot | 156/394 |
| 3,752,726 | 8/1973 | Barefoot | 156/394 |
| 3,779,830 | 12/1973 | Reppel | 156/394 |
| 3,779,831 | 12/1973 | Reppel | 156/394 |
| 3,779,832 | 12/1973 | Reppel | 156/96 |
| 3,779,833 | 12/1973 | Reppel | 156/394 |
| 3,793,116 | 2/1974 | Schelkmann | 156/394 |
| 3,815,651 | 6/1974 | Neal | 152/187 |
| 3,846,201 | 11/1974 | Huskins | 156/96 |
| 3,963,393 | 6/1976 | Barefoot | 425/20 |
| 3,976,532 | 8/1976 | Barefoot | 156/405 |
| 3,989,563 | 11/1976 | Schelkmann | 156/96 |
| 4,092,203 | 5/1978 | Harrelson | 156/394 |
| 4,115,171 | 9/1978 | Dundon | 156/96 |
| 4,123,306 | 10/1978 | Landry | 156/96 |
| 4,153,497 | 5/1979 | Budrioli | 156/394 |

OTHER PUBLICATIONS

Bandag, Incorporated, "Annual Report 1970", Muscatine, Iowa, p. 11.

Primary Examiner—John E. Kittle
Attorney, Agent, or Firm—James D. Haynes

[57] ABSTRACT

In a method and apparatus for securing a pre-cured tread to a tire during vulcanization to retread the tire, a sealing grid having annular rings disposed thereon to contact the sides of an envelope disposed about the tread and against the sides of the tire to cause a seal therebetween wherein said grids are easily joinable to effect such seal without the need of the tire being mounted on a rim or being inflated.

25 Claims, 17 Drawing Figures

METHOD AND APPARATUS FOR VULCANIZING TIRES

BACKGROUND OF THE INVENTION

There is a continuing need to provide more efficient methods for retreading or recapping worn tire carcasses. Energy consumption and time dictate economy in recapping procedures.

While the recapping of tires is an old art, the methods of recapping tires has changed substantially within the last few years. Changes have resulted beause of the basic redesign of the tire itself from bias chord tires to belted and radial tires.

One of the earliest methods of retreading a tire was to place the tire into a mold in which the new tread was formed as a part of the tire. Another method is to attach a premolded tread to the tire carcass.

Tires to be retreaded in molds are buffed and covered with a layer of uncured rubber, and placed into a standard tire retreading mold. In the mold the rubber is shaped into the desired tread pattern by pressurizing the inside of the tire and heating the entire assembly until the uncured rubber is cured, formed and bonded to the old casing by a combination of heat and pressure. An apparatus for this type of operation is shown in U.S. Pat. No. 3,042,966.

Moldless retreading uses a strip of precured and premolded tread supplied in a long continuous strip from an extrusion and molding process. This precured and preformed strip of tread material is vulcanized before it is applied to the tire casing.

In this method, the worn out tire is buffed and the precured and premolded tread rubber is applied to the buffed casing with a layer of uncured raw rubber compound therebetween. The tire is then wrapped up in an adjustable thin steel band and inflated and the entire assembly is then heated and cured in a pressurized and heated chamber.

This retreading process resulted in a recapped tire which inherently had a seam where the two ends of the precured tread joined. An apparatus of this type is shown in U.S. Pat. No. 2,966,936.

More recently, it has been discovered that a seamless, preformed and cured annular tire tread as disclosed in U.S. Pat. No. 3,815,651 may be formed as in U.S. Pat. No. 3,963,393. This tread is then placed about the prepared tire carcass as disclosed in U.S. Pat. No. 3,976,532 and bonded to the tire carcass.

In the various forms of moldless retreading, a flexible rubber envelope encases all or a substantial portion of the carcass and the precured tread. The envelope's interior is subjected to a reduced pressure and its exterior is subjected to an increased pressure to thus hold the tire tread firmly in place while it is bonded to the tire carcass. Such an apparatus is shown in U.S. Pat. No. 3,779,830 which teaches inflation of the carcass during tread replacement.

The tire together with its supporting medium and its encasement is placed in a heated chamber or autoclave for vulcanization of the preformed tread to the tire carcass. The time needed to complete vulcanization is determined by how fast vulcanizing temperature is transmitted to the material to be vulcanized. The time required is a function of the size of the tire, its encasement, and the means used to inflate and hold the tire.

The conventional time required to vulcanize an inflated tire is approximately four hours for an apparatus similar to that shown in U.S. Pat. No. 3,236,709. The heat is permitted to essentially penetrate the treated area only in an unilateral manner.

The tires are conventionally encased in an envelope during preformed tread vulcanization. The placement of the envelope about the tire in a sealed relationship is cumbersome and time consuming.

SUMMARY OF THE INVENTION

The present invention related to a method and apparatus for recapping tires with pre-vulcanized profiled treads by means of a layer of bonding material sandwiched between the outer tire surface and the tread. The parts to be vulcanized are encased in a flexible air-tight envelope. Gases are removed from the envelope; the enclosed parts are then heated and pressurized in an autoclave or similar device whereby the tread is permanently bonded to the outer tire surface. The pressure is between 60 to 90 PSI.

It is a general object of this invention to overcome the disadvantages of the prior art.

It is a more particular object of this invention to provide a means for easily encasing the parts to be vulcanized in an envelope and securing the envelope to the tire.

It is also an object of this invention to provide a quickly implaceable means for securing the envelope to the tire in such a way that does not require the tire to be inflated during vulcanization.

In the present invention sealing grids have annular rings thereon which press against the envelope and the sides of the tire. The sealing grids are positioned on opposite sides of a tire and are detachably engaged to each other. The grids utilize the resiliency of the tire carcass and the forces generated on the tire carcass by the continuous precured tread to effect an air tight seal between the tire and the envelope. Also, spring-loaded clamps may be used to join the grids together.

In prior art devices, especially those adapted for vulcanizing continuous treads to tire carcasses, the tire itself has been inflated during vulcanization. The envelope either entirely covered the tire and its rim or covered most of the tire and was pressed against the tire by the rim itself or by the retreading mold.

The present invention does not require that the tire be inflated during vulcanization nor have a rim to support the carcass during vulcanization.

DESCRIPTION OF THE PREFERRED EMBODIMENT

Figure 1:
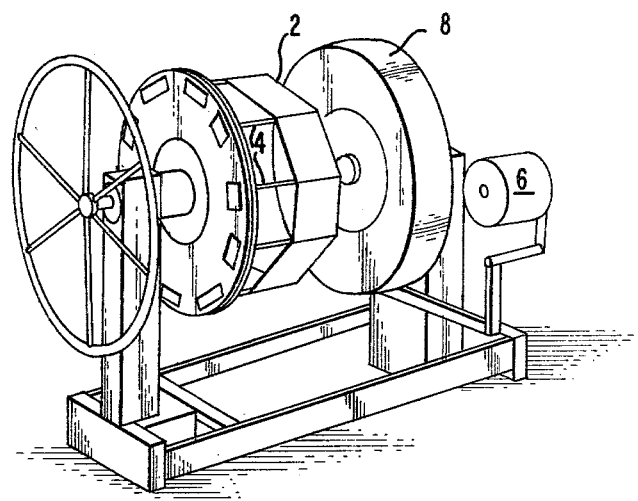
FIG. 1 is a perspective view of an apparatus for placing a preformed continuous tread on the carcass of a tire.
Figure 1B:
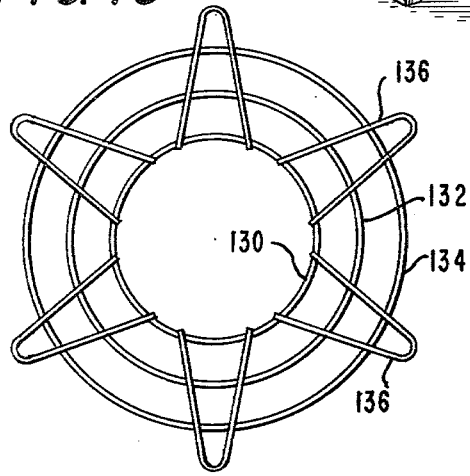

Referring to FIG. 1, an apparatus similar to that shown in U.S. Pat. No. 3,976,532 (invented by the inventor of the present apparatus and method) is used to place a continuous pre-cured tread on a prepared tire carcass. The pre-vulcanized continuous tread 2 is expanded by finger assemblies 4.

A vulcanizing medium 6 is placed around the tire 8 before the expanded tread 2 is positioned around the carcass 8 and relaxed. The tread is then rolled to secure it to the carcass prior to final vulcanization.

Once the tread is positioned on the carcass it is necessary to cause the sealing medium 6 to vulcanize the tread to the tire. It is this method and apparatus that comprises the present invention.

Figure 2:
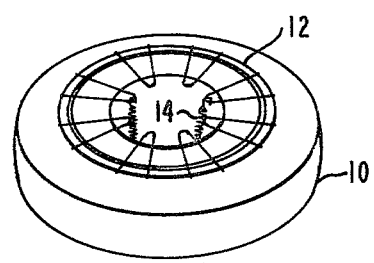
FIG. 2 is a perspective view of a tire with the sealing grids thereon.

The tire and the tread must be securely bound one to the other prior to and during the vulcanization of the two into one. Referring to FIG. 2, an envelope 10 encases the tread and part of the side of the tire. Sealing grid 12 is placed against the side of the envelope 10 and presses the envelope against the side of the tire. Sealing grids are placed on each side of the tire and are detachably engaged one to the other by biasing means 14. With the sealing grids in place, the envelope is sealed against the tire. There is no need for the tire to be inflated or supported on a rim during the remainder of the vulcanizing process.

Figure 3:
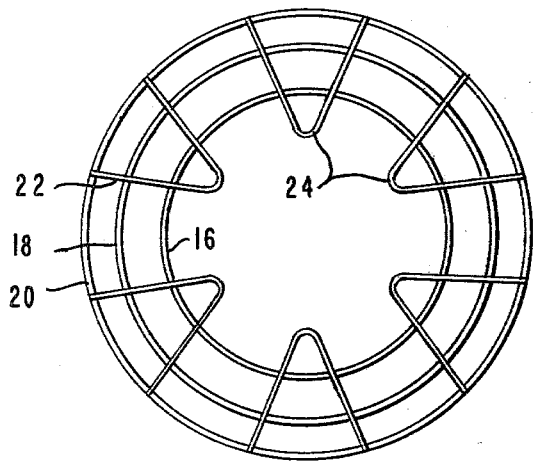
FIG. 3 a diagrammatic view of the sealing grid of the present invention.

The exact structure of the preferred embodiment of the sealing grid may be easily comprehended from FIG. 3. The sealing grid is comprised of a plurality of annular rings 16, 18 and 20. Radial members 22 join the annular members 16, 18 and 20 into an unitary grid.

Radial members 22 are V-shaped to thus form at their innermost ends securing or engaging means 24. The engaging means may be adapted to have any configuration desired to compliment and mate with the engaging means 26 (FIG. 4) which join the grids disposed on opposite sides of the tire carcass one to the other.

Figure 4:
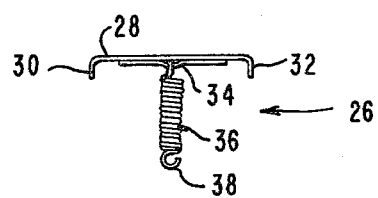
FIG. 4 is a schematic view of the engaging means of the present invention.

The engaging means 26 may have different embodiments. A preferred embodiment is shown in detail in FIG. 4. A rod-like member 28 has engaging means 30 and 32 disposed at opposite ends thereof. An eyelett 34 may be formed integrally with rod-like member 28 as is shown in FIG. 4.

A spring-like means 36 is engaged to eyelett 34 and has at its other end an engaging means 38. The length of rod-like member 28 and the length of spring-like member 36 are of such length to accommodate the particular dimensions of the sealing grids 12.

In the preferred embodiment, it is envisioned that the engaging means 30 and 32 will mate with adjoining engaging means 24 and that engaging means 38 will mate with an engaging means 24 of the sealing grid disposed on the opposite side of the tire to thus engage one sealing grid to the other and to bring sufficient pressure against the sides of the tire to cause the sealing of the envelope 10 to the sides of the tire 8.

Other embodiments of the engaging means 26 will be disclosed in the remaining portion of the specification and the drawings.

Figure 5:
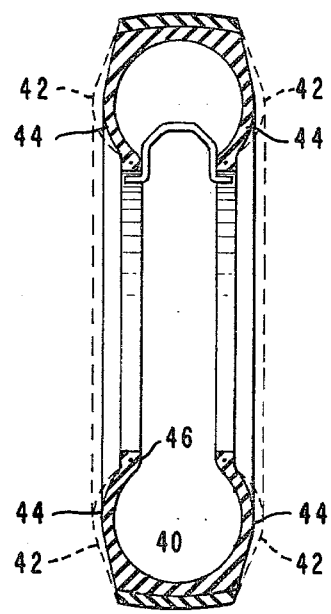
FIG. 5 is a cross-sectional view of a tire carcass showing the position of the tire before and after placement of the sealing grids thereon.

Referring to FIG. 5, a tire carcass 40 is shown in the position before and after compression of the sides thereof by the placement of sealing grids 20 thereon. The position of the tire before sealing pressure is applied is shown in dotted lines at 42. The position of the tire after the pressure of the sealing grids is applied is shown at 44 and in solid lines.

As the sealing grids are brought into a mating relationship with the tire therebetween, the pressure exerted on the side of the tire is resisted by the resiliency of the tire carcass. The beads 46 (FIG. 6) cause the carcass of the tire to resist radial movement toward the axis 48 of the tire. The residual forces within the tire carcass cause the sides of the tire to attempt to return to their relaxed state.

Figure 6:
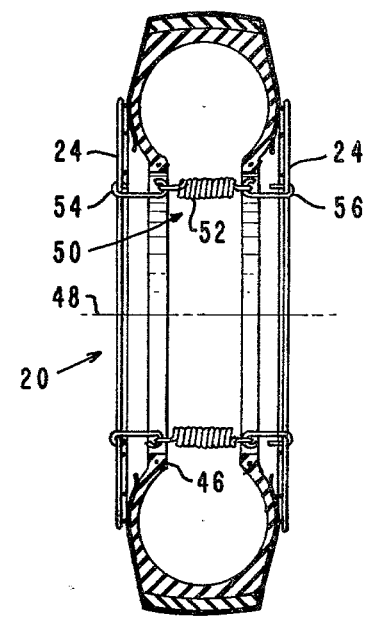
FIG. 6 is a cross-sectional view of a tire carcass with the sealing grids in place showing a preferred embodiment of the engaging means.

Yet another embodiment of the engaging means of FIG. 4 is shown in FIG. 6 as 50. Spring-like member 52 has joining means 54 and 56 which mate with engaging means 24 of the sealing grids 20. FIG. 6 shows the cross-sectional view of the sealing grid and the tire carcass with the engaging means 50 in place.

Figure 7:
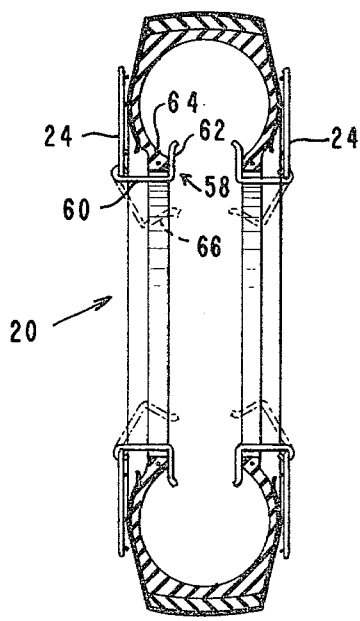
FIG. 7 is a cross-sectional view of a tire carcass showing another embodiment of the sealing grids of the present invention.

FIG. 7 shows yet another embodiment of an engaging means for joining the sealing rings into mating relationship with the tire. In this embodiment, however, the sealing rings are not joined one to the other. Instead the sealing rings are joined directly to the side of the tire independently of the other sealing ring.

Engaging means 58 is an L-shaped member rotatably mounted in engaging means 24 of a sealing grid 20. The shaft portion 60 of the engaging means 58 is dimensioned to accommodate the particular tire design and to bring the bear such pressure upon the tire when finger portion 62 thereof is rotatably engaged with the inner side of bead 64. Engaging means 58 is shown in the disengaged position in dotted lines at 66.

Figure 8:
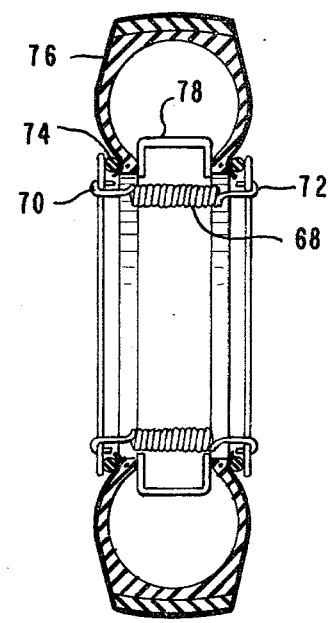
FIG. 8 is a cross-sectional view of a tire showing a different embodiment of a sealing grid.

Yet another embodiment of the present invention is disclosed in FIG. 8. In this embodiment, engaging means 68 is a spring having integrally formed therewith engaging means 70 and 72. The sealing grid shown in this embodiment is comprised of a single annular ring 74 which, when the sealing grid is in position, bears against the bead portion of the tire. The envelope 76 has sides which extend down the tire side of the tire whereby the sealing grid ring 74 causes a seal between the envelope 76 and the side of the tire in the region of the bead thereof.

Spacers 78 may be used for forcing the beads apart to thus maintain predetermined spacing therebetween. The spacers 78 may be randomly spaced about the inner portion of the tire. It is suggested that three or four spaces be used to equalize the forces about the bead of the tire.

Figure 9:
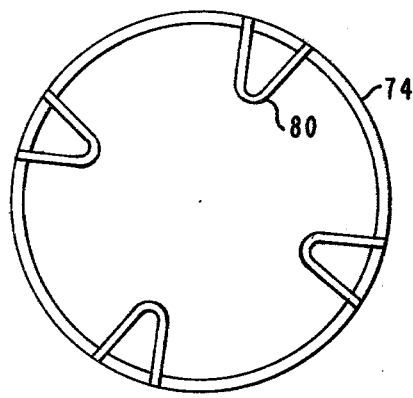
FIG. 9 is a schematic view of the sealing grid of FIG. 8.

A detail of the sealing grid of FIG. 8 is shown in FIG. 9. Annular ring 74 has spaced thereabout a plurality of U-shaped engaging means 80. The end of U-shaped engaging means 80 permits the engaging means 70 and 72 of engaging means 68 (FIG. 8) to easily attach thereto. This embodiment of the sealing grid may be used with or without spacers 78 as dictated by the particular resiliency of the tire carcass. The spacers disclosed in FIG. 8 may also be used with the other sealing grid configurations disclosed herein.

Figure 10:
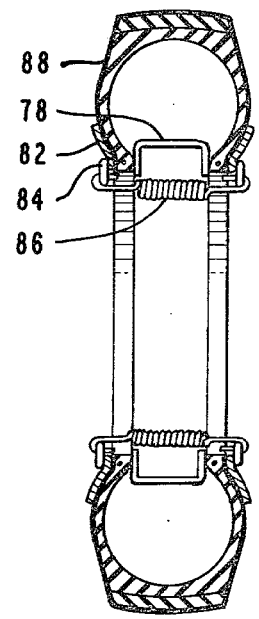
FIG. 10 is a cross-sectional view of a tire showing a different embodiment of a sealing grid according to the present invention.

Yet another embodiment of the sealing grid is shown in FIG. 10. The sealing grid 82 is in the form of bead shims or sidewall plates which rims have eyeletts 84 randomly spaced thereabout. An engaging means 86 engages the eyeletts to cause the sealing grids 82 to bear against the sides of the tire to seal the envelope 88 to the tire. A spacer 78 may also be used in this embodiment if desired. The design of this grid permits the pressure to be expended over a wider portion of the sidewall of the tire to offer a larger sealing area.

There is no need for the tire to be inflated to utilize the present invention. The vulcanizing time of this embodiment is greatly reduced since the heat can circulate inside the tire as well as the outside. This bi-lateral heating results in reduced cycle time for vulcanizing the pre-cured tread to the tire which ultimately means increased efficiency, reduced energy consumption and increased profits.

Utilizing the present invention, a cure time of approximately twenty (20) minutes at 300 degrees Fahrenheit will result in a properly cured tire. This reduces the cure time presently used by about one-half. Cure time will vary, depending on thickness of tread and thickness of carcass. Therefore, the above will not apply to all tread thickness and all size cacass. The curing time for larger tires is reduced as well.

Figure 11:
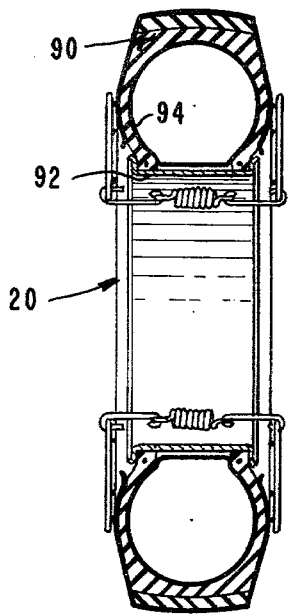
FIG. 11 is a cross-sectional view of a tire showing the sealing grids of the present invention in use with a quick change road type rim.

The present invention may be used with a tire that is mounted on a rim. Such an embodiment is shown in FIG. 11. Tire 90 may be mounted on a quick change road type rim 92. Sealing grids 20 are placed on either side of the tire and force is applied against the sides of the tire in the manner heretofore explained. The tire may be equipped with a bladder 94 although this is not necessary.

Figure 12:
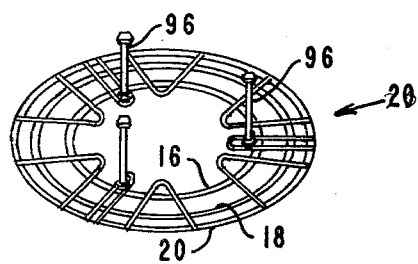
FIG. 12 is a schematic view of the preferred embodiment of the sealing grids of the present invention with bead spacers mounted thereon.

Referring to FIG. 12, the sealing grids 20 may be equipped with bead separators 96 which separators press against the bead of the tire when the sealing grids are in place to thus prevent the beads of the tire from being forced inwardly toward each other. The bead separators 96 may be of any number, however, it has been discovered that three or four are adequate. The separators are of such length and positioned on the grid at such location to cause the outwardly extending end of the separator to come to bear against the inside of the tire carcass at the bead of the tire.

Figure 13:
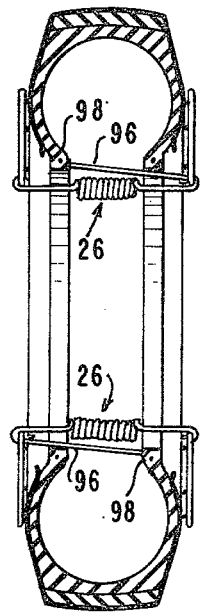
FIG. 13 is a cross-sectional view of a tire carcass with the sealing grids of FIG. 12 in place and with the bead separators positioned to maintain the beads of the tire apart during vulcanization.

A better appreciation of the bead separators may be had with reference to FIG. 13. The bead separators 96 are positioned to bear against the inside of bead 98 to thus prevent inward movement of the bead as the pressure is applied by engaging means 26. The combination of forces exerted on the tire by the bead spacers and the sealing grids results in a perfectly sealed envelope without significant distortion of the tire. It can be appreciated that as the engaging means 26 exerts the resulting force upon engaging means 26, the inward annular ring 16 (FIG. 12) is slightly urged toward the other sealing grid thus causing a cantilevered effect with respect to bead separator 96. This cantilevered action of bead separator 96 results in the most outwardly extending end of the bead separator which rests against the inside of the bead to also exert an upwardly pressure against the other bead of the tire. Thus the action of the bead separator may be two-fold, i.e., it repels the opposite bead and the nearer bead is forced upwardly. The combination of these forces, the resiliency of the tire sides, and the forces of the sealing grids causes the tire to be maintained in a proper configuration during vulcanization.

Figure 14:
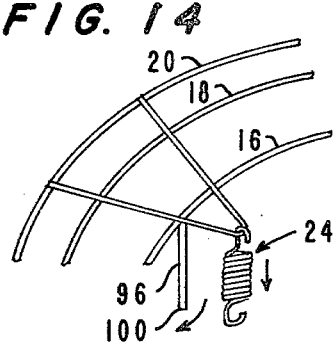
FIG. 14 is a view of the sealing grid of FIG. 12, partially broken away, showing the bead positioner.

The detail of the engaging means of the sealing grid in FIG. 14 may serve to more fully explain the cantilevered forces of the bead separators. As the engaging means causes the engaging means 24 to be forced downwardly, the annular ring 20 is forced against the side of the tire. This permits annular ring 16 to move downwardly which results in the bead separator having a turning moment about annular ring 20 as force is applied at 24. Thus, end 100 of bead separator 96 moves in the direction noted by the arrow which is, when the tire is in place, into the inside of the tire on the opposite side of the tire from the side of the tire where the sealing grid is positioned.

Figure 15:
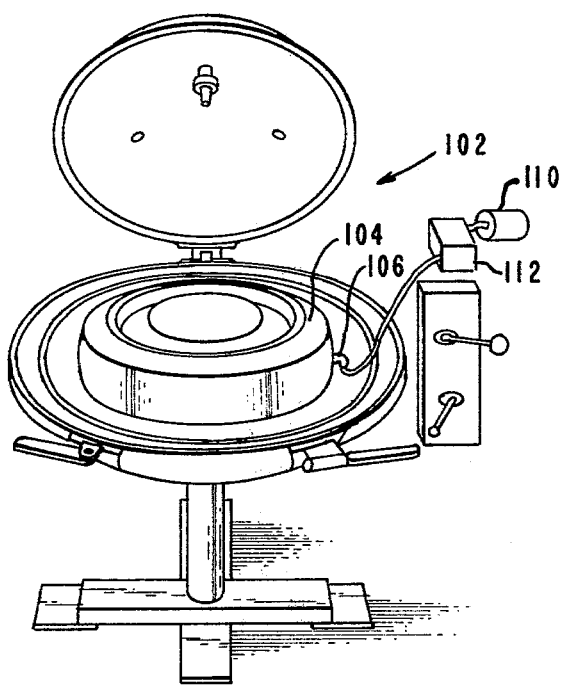
FIG. 15 is a perspective view of an autoclave with an encased tire therein readied for treatment.

Once the sealing grids are in place and the envelope is properly sealed to the tire, it is necessary to complete the vulcanization process. This may be done by placing the tire in an autoclave or similar device to heat the entire combination. FIG. 15 shows an autoclave 102 with a readied tire 104 therein. The interior of the autoclave is pressurized to thus exert a fluid pressure on the outside of the envelope. The interior of the autoclave is then heated to cause the tire to vulcanize. (Pressurization and heating may occur simultaneously as by inroducing heated pressurized air.)

The nozzle 106 on the envelope 108 may be vented to atmosphere or it may be connected to a vacuum tank 110 via a pressure regulator 112. The tank and regulator may remain inside of the autoclave during vulcanization to thus decrease the complexity of set-up. The tank may be placed inside the tire carcass.

Creative use of the differential pressure obtainable between the internal pressure of the autoclave and the pressure introduced via the vacuum tank 110 will produce any desired pressure on the tread. The pressure (and thus the temperature) of the autoclave can be varied to achieve a desired resultant pressure on the tire tread as well as autoclave temperature.

Figure 16:
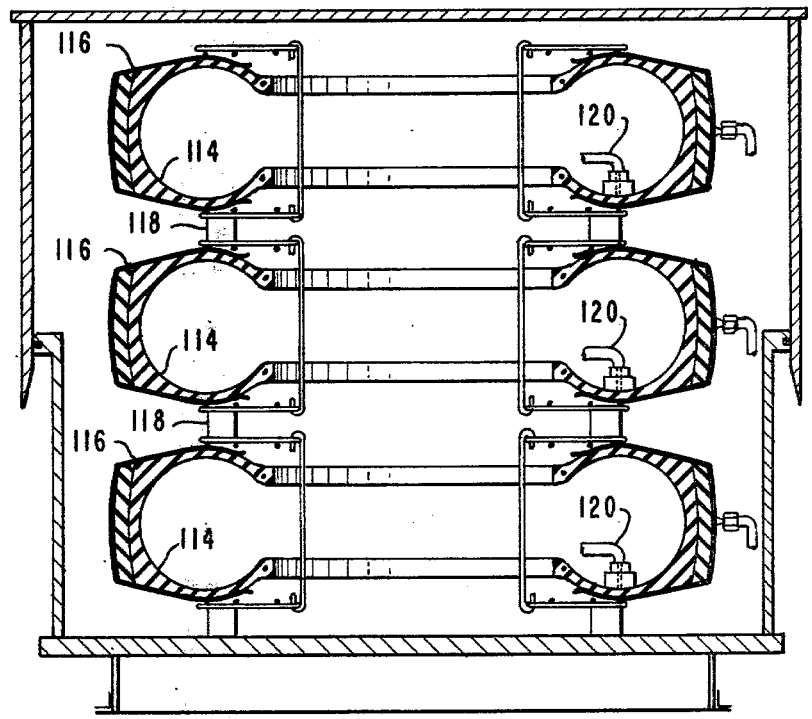
FIG. 16 is a diagrammatic cross-sectional view of an autoclave showing multiple tires readied for treatment.

FIG. 16 discloses a multiple-tire autoclave in cross-section. Tires 114 are each encompassed within an envelope 116 and maintained spaced apart by separators 118. Nozzles 120 may be placed within the inside of the carcass cavity when supersaturated steam is used to thus remove condensate from within the tire during vulcanization. The steam is permitted to flow freely in and about the tires. The separators 118 are such that the flow of steam is not inhibited. A plurality of tires may be vulcanized as easily and quickly as a single tire.

It is to be understood that, although several preferred embodiments of the invention have been shown in the drawings and described with considerable particularity in the foregoing specification, the invention is not limited to the specific details and forms shown and described, but includes all modifications coming within the scope of the invented claims and their equivalents.

A better appreciation of the bead separators may be had with reference to FIG. 13. The bead separators 96 are positioned to bear against the inside of bead 98 to thus prevent inward movement of the bead as the pressure is applied by engaging means 26. The combination of forces exerted on the tire by the bead spacers and the sealing grids results in a perfectly sealed envelope without significant distortion of the tire. It can be appreciated that as the engaging means 26 exerts the resulting force upon engaging means 26, the inward annular ring 16 (FIG. 12) is slightly urged toward the other sealing grid thus causing a cantilevered effect with respect to bead separator 96. This cantilevered action of bead separator 96 results in the most outwardly extending end of the bead separator which rests against the inside of the bead to also exert an upwardly pressure against the other bead of the tire. Thus the action of the bead separator may be two-fold, i.e., it repels the opposite bead and the nearer bead is forced upwardly. The combination of these forces, the resiliency of the tire sides, and the forces of the sealing grids causes the tire to be maintained in a proper configuration during vulcanization.

The detail of the engaging means of the sealing grid in FIG. 14 may serve to more fully explain the cantilevered forces of the bead separators. As the engaging means causes the engaging means 24 to be forced downwardly, the annular ring 20 is forced against the side of the tire. This permits annular ring 16 to move downwardly which results in the bead separator having a turning moment about annular ring 20 as force is applied at 24. Thus, end 100 of bead separator 96 moves in the direction noted by the arrow which is, when the tire is in place, into the inside of the tire on the opposite side of the tire from the side of the tire where the sealing grid is positioned.

Once the sealing grids are in place and the envelope is properly sealed to the tire, it is necessary to complete the vulcanization process.

Figure 17:
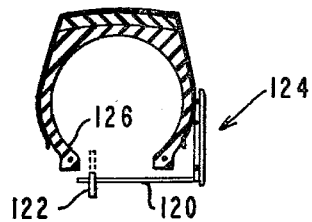
FIG. 17 is a diagrammatic view of the sealing grid of the present invention having engaging means at the periphery thereof.

FIG. 17 shows yet another embodiment of the grid of the present invention with a variation of the bead separators disclosed in FIG. 14. The sealing grid of FIG. 17 has vertical members 120 mounted thereon to extend into the axial opening of the tire when the grid is placed on a side of the tire. Rotably mounted on the end of the vertical member is rotatable finger 122 which may be rotated to thus securely engage the inner surface of tire bead 126. In this embodiment, one does not need to rely exclusively on the displacement of the end of vertical member 120 to bring its end against the bead 126.

FIG. 18 discloses a variation of the sealing grid which permits the retaining means 26 (FIG. 4) to be secured at the periphery instead of the inside thereof. The grid accomplishes the same purpose as the grids heretofore disclosed.

The grid is dimensioned to cause annular member 132 to be positioned in the area of the tire having the greatest width. For example, this would be the point of contact of the grids as shown in FIG. 6. As clamping forces are applied to connecting means 136 the interaction of forces causes maximum forces to be applied against the tire by annular member 132.

The downward pressure on connecting or engaging means 136 forces the annular member 134 downwardly. Annular member 136 acts as the fulcrum while annular member 130 is forced upwardly. The maximum pressure is therefore exerted by member 132 to seal the envelope to the tire.

I claim:

1. In an apparatus for vulcanizing a tire tread to a tire carcass while said tire is only partially encased in an envelope, means for effecting a sealing relationship between said tire carcass and said envelope, said means comprising in combination:
   a first grille;
   a second grille; and
   means for detachably engaging said first grille and said second grille in a mating relationship on opposite sides of said tire carcass;
   said first grille comprising an annular ring for engaging said envelope between the side of said tire carcass and said annular ring;
   said second grille comprising an annular ring for engaging said envelope between the side of said tire carcass and said annular ring;
   and, wherein the inside of said tire carcass is unobstructed to airflow to thus enable enhanced heat flow to the entire tire carcass.

2. The invention as set forth in claim 1 wherein said first grille further comprises:
   a plurality of annular members joined into an unitary embodiment by radial members having receptacle means at the innermost ends thereof, and
   wherein said first grille members and said second grille members are joined one to the other by detachable means connected to said receptacle means of said first grille.

3. The invention as set forth in claim 2 wherein said detachable means comprises:
   means for engaging said receptacle means of said first grille;
   means for engaging said second grille; and
   means for exerting force to cause said first and said second grille means to press inwardly and against said tire carcass to press said envelope against said tire carcass to effect a seal therebetween.

4. The invention as set forth in claim 1 wherein said means for effecting a seal between said tire carcass and said envelope exerts such pressure against the sides of said tire carcass to cause same to be distorted to such extent to cause the residual elasticity inherent in said tire carcass to inately push the side of said tire carcass against said first grille and said second grille to thereby effect a sealing relationship between said envelope and said tire carcass.

5. The invention as set forth in claim 2 wherein said means for detachably engaging said first grille and said second grille in a mating relationship comprises a plurality of connector means comprising:
   a first member having a length sufficient to span the distance between adjacent said receptacle means, said first member having connecting means at each end thereof for detachable engagement with said receptacles; a fastening means; and
   spring means connected between said first member and said fastening means for biasing said first member and said fastening means, said fastening means being so dimensioned as to detachably engage said second grille to force said first and second grilles toward each other and against the sides of said tire carcass.

6. The invention as set forth in claim 1 wherein said first grille further comprises a plurality of axial members joined to said grille substantially perpendicular to the plane of said annular ring such axial members being positioned on said grille at such location whereby said axial members extend into the hub portion of the tire and being of such length to cause the end of said axial member to press against the inside of the bead of said tire carcass whereby said axial member exerts a force against said bead to thus cause the side of said tire to move outwardly against said grilles when said first grille and said second grille are joined together.

7. The invention as set forth in claim 1 wherein said tire tread has an inside circumference less than the relaxed circumference of said tire carcass to thus compress said tire, said compression causing the sides of said tire to extend outwardly, the deformation of the sides of the tire thus produced coacting with the forces produced by said axial members against side tire beads and the forces produced against the sides of said tire by said grilles to thus produce sufficient compression between said annular rings and said tire sides to cause said envelope to be sealed to said tire sides.

8. In combination, an unmounted carcass having a preformed tread disposed about its periphery, an envelope covering said tread and partially covering the sides of said tire, and first and second sealing grilles each having a first annular ring, said first annular ring being disposed to press the envelope against a side of said tire when said first annular ring is concentrically aligned with the axis of said tire, said first grille having a plurality of clasps rotatably disposed thereon for engagement with the inside of the tire beads to thus exert an inward force on the side of said tire and said envelope and an outward force on the bead of said tire whereby the envelope is snugly fitted to the side of said tire.

9. The invention as set forth in claim 8 wherein said grille further comprises a second annular ring concentric with and smaller than said first annular ring and a plurality of spoke-like members joining said first and second annular rings together to form a planar grille, said spoke-like members extending inwardly of said second annular ring and said clasp being disposed on the said inwardly extending portion of said spoke-like members.

10. The invention as set forth in claim 2 to further comprise means connected to said envelope for reducing the pressure in the cavity formed between said tire and said envelope, said means comprising a tank and a hose connecting said tank to said envelope, said tank being dimensioned to be placed inside the carcus of said tire during vulcanization.

11. The invention as set forth in claim 10 wherein said tank is pre-pressurized before being connected to said envelope and has pressure regulator means for providing a predetermined pressure differential between said cavity and the outside of said envelope during vulcanization.

12. A method for retreading an unmounted tire with a precured premolded tread comprising the steps of:
  a. covering the sides of a tire and a precured tread assembly with a thin flexible envelope which extends only from sidewall to sidewall around the outer perimeter of said tire,
  b. positioning a sealing grid on each sidewall of said tire whereby an annular ring of said sealing grid urges the envelope against the sidewall,
  c. detachably joining the sealing grids together,
  d. placing the assembly, the envelope and the sealing grids in an autoclave,
  e. evacuating the air trapped between the tire and the envelope,
  f. subjecting the assembly, the envelope and the sealing grids to a heated pressurized environment to cause the tread to be vulcanized to the tire.

13. The method as claimed in claim 12 wherein the interior of said tire is unobstructed during vulcanization.

14. The method as claimed in claim 12 to further comprise the step of positioning a bead spacer disposed on the sealing grid against the bead of the tire opposite the side where the respective sealing grid is positioned, prior to joining the sealing grids together.

15. The method as claimed in claim 12 to further comprise the step of forcing the beads of the tire apart while the sealing grids are detachably joined one to the other.

16. The invention as set forth in claim 1 wherein said first grille further comprises:
  a plurality of annular members joined into an unitary embodiment by radial members having receptacle means at the outermost ends thereof, and
  wherein said first grille members and said second grille members are joined one to the other by detachable means connected to said receptacle means of said first grille.

17. A grille for temporary sealing engagement of an envelope against a side of a tire to be retreaded when said grille is detachably engaged to another grille disposed on the other side of said tire, said grille having:
  a surface lying within a plane and for engaging said envelope,
  an engagement means integral to said surface for enabling engagement of the grille on one side of said tire to the grille on the other side of said tire, and
  a plurality of rod-like members perpendicular to said plane and positioned to extend into the hub portion of said tire when said grilles are in mating engagement,
said rod-like members being of sufficient length to press against the inside of the bead of said tire opposite the side where said grille is positioned to exert a force against said bead to thus cause such side of said tire to move outwardly against the grille disposed on said opposite side.

18. A grille as set forth in claim 17 wherein said surface of said grille comprises a plurality of concentric annular rings secured together by a plurality of radial members forming at their innermost ends engagement means useful in engaging said grille to said another grille when said grilles are located on opposite sides of a tire and in substantial axial alignment with said tire.

19. A grille as set forth in claim 18 in combination with means for detachably engaging said grille to said another grille, said means for detachably engaging said grille to said another grille comprising:
  a first member having a length sufficient to span the distance between adjacent innermost ends of said radial members and having means at each end thereof for detachable engagement with an engagement means at the innermost end of a said radial member,
  fastening means, and
  tensioning means connected between said fastening means and said first member,
wherein said tensioning means causes said grille to be forced against a side of said tire when said fastening means is connected to an engagement means at the innermost end of a radial member of a grille disposed on an opposite side of a tire.

20. A grille as set forth in claim 18 in combination with means for forceably securing said grille to said another grille, said means having:
- a first engaging means for securing an engagement means disposed at the end of said radial members of said grille and
- a second engaging means for securing an engagement means disposed at the end of said radial members of said another grille, said first engaging means and said second engaging means being joined together to cause said grille and said another grille to be biased toward each other and against their respective tire sides when said means for foreceably securing said grille to said another grille is in position.

21. A grille for temporary sealing engagement of an envelope against a side of an unmounted tire to be retreaded when said grille is detachably engaged to the side of the tire, said grille being connected only to said tire and comprising:
- a surface lying with a plane and for engaging said envelope; and
- engagment means rotatably connected to said grille and adapted to engage the inside of the tire only on that side of the tire whereupon said grille is effecting temporary sealing engagement of said envelope against said tire.

22. A grille as set forth in claim 20 wherein said engagement means comprises an L-shaped member having a first leg and a second leg, said first leg being rotatably engaged to said grille at its outmost end and having length sufficient to enable said second leg of said L-shaped member to engage the bead of said tire to cause said grille to assume said temporary sealing engagement.

23. The method as set forth in claim 12 to include the steps of joining the sealing grids together with spring means secured to the ends of radial members disposed on said sealing grid.

24. A method for retreading an inflatable tire with a preformed tread comprising the steps of:
- a. placing a preformed tread about the periphery of an unmounted tire having a substantially unobstructed interior;
- b. encasing said tread and a portion of the sides of said tire in an envelope;
- c. positioning a planar sealing grid on each side of said tire;
- d. joining each said sealing grid to the bead of said tire to sealingly engage said envelope against said tire; and
- e. vulcanizing said tread to said tire.

25. The method of claim 24 to further include the step of positioning L-shaped engaging means disposed at the interior of each said grid against the inside of the bead of said tire to thus cause said grids to sealingly engage said envelope against said tire.

* * * * *